US009266637B2

(12) United States Patent
Clusserath et al.

(10) Patent No.: US 9,266,637 B2
(45) Date of Patent: Feb. 23, 2016

(54) TREATMENT MACHINE FOR CONTAINERS

(75) Inventors: Ludwig Clusserath, Bad Kreuznach (DE); Thomas Stolte, Bad Kreuznach (DE); Udo Grunewald, Weiler (DE)

(73) Assignee: KHS GmbH, Dortmund (DE)

( * ) Notice: Subject to any disclaimer, the term of this patent is extended or adjusted under 35 U.S.C. 154(b) by 232 days.

(21) Appl. No.: 13/704,395

(22) PCT Filed: May 18, 2011

(86) PCT No.: PCT/EP2011/002490
§ 371 (c)(1), (2), (4) Date: Dec. 14, 2012

(87) PCT Pub. No.: WO2012/007080
PCT Pub. Date: Jan. 19, 2012

(65) Prior Publication Data

US 2013/0087429 A1 Apr. 11, 2013

(30) Foreign Application Priority Data

Jul. 15, 2010 (DE) ........................ 10 2010 027 337

(51) Int. Cl.

| | |
|---|---|
| ***B23D 47/00*** | (2006.01) |
| ***B65B 61/00*** | (2006.01) |
| ***B08B 3/02*** | (2006.01) |
| ***B08B 9/32*** | (2006.01) |
| ***B08B 9/34*** | (2006.01) |
| ***B65C 9/00*** | (2006.01) |
| ***B67B 3/00*** | (2006.01) |
| ***B67C 3/00*** | (2006.01) |
| ***B67C 3/22*** | (2006.01) |

(52) U.S. Cl.
CPC . *B65B 61/00* (2013.01); *B08B 3/02* (2013.01); *B08B 9/32* (2013.01); *B08B 9/34* (2013.01); *B65C 9/00* (2013.01); *B67B 3/00* (2013.01); *B67C 3/001* (2013.01); *B67C 3/005* (2013.01); *B67C 3/22* (2013.01)

(58) Field of Classification Search
USPC .................. 198/493, 494, 502.2, 339.1, 340, 198/341.01, 341.02, 341.03, 341.08
See application file for complete search history.

(56) References Cited

U.S. PATENT DOCUMENTS 3,515,180 A 6/1970 Friendship
4,588,001 A 5/1986 Leonard
5,085,170 A * 2/1992 Huttlin ...................... B01J 2/16 118/303

(Continued)

FOREIGN PATENT DOCUMENTS

DE 82 32 367 2/1983
DE 32 24 172 12/1983
DE 92 17 784 4/1993

(Continued)

*Primary Examiner* — Gene Crawford
*Assistant Examiner* — Lester Rushin
(74) *Attorney, Agent, or Firm* — Occhiuti & Rohlicek LLP

(57) ABSTRACT

A treatment machine for containers includes a drive unit and a manipulation unit connected to the drive unit. The drive unit comprises a hollow bore, the hollow bore being configured to accommodate an accommodated structure, which is either a machine-specific subassembly or a line.

25 Claims, 5 Drawing Sheets

(56) References Cited

U.S. PATENT DOCUMENTS

| | | | | |
|---|---|---|---|---|
| 7,049,718 | B2 * | 5/2006 | Nickel-Jetter | H02K 5/1737 310/156.01 |
| 7,244,083 | B1 * | 7/2007 | Gottschalk et al. | 409/232 |
| 8,656,688 | B2 * | 2/2014 | Schonfelder | B67B 3/00 53/317 |
| 8,657,598 | B2 * | 2/2014 | Zacche' | 425/529 |
| 2004/0209223 | A1 * | 10/2004 | Beier et al. | 433/99 |
| 2008/0012304 | A1 * | 1/2008 | Fujiwara | 285/272 |
| 2009/0183798 | A1 * | 7/2009 | Till | B65G 47/847 141/148 |
| 2012/0199439 | A1 * | 8/2012 | Secchi et al. | 198/339.1 |

FOREIGN PATENT DOCUMENTS

| | | |
|---|---|---|
| DE | 94 19 501 | 3/1995 |
| DE | 10 2006 039090 | 2/2008 |
| EP | 1 275 612 | 1/2003 |
| WO | WO2008/145363 | 12/2008 |

* cited by examiner

TREATMENT MACHINE FOR CONTAINERS

CROSS-REFERENCE TO RELATED APPLICATIONS

This application is the National Stage of International Application No. PCT/EP2011/002490, filed on May 18, 2011, which claims the priority of German Application No. 10 2010 027 337.6, filed on Jul. 15, 2010. The contents of both applications are hereby incorporated by reference in their entirety.

FIELD OF DISCLOSURE

The invention relates to a treatment machine for containers, e.g. bottles, cans or the like, comprising at least one drive unit and a container-manipulation unit that is connected to the drive unit, wherein at least the drive unit has a hollow bore.

BACKGROUND

A treatment machine for containers includes any machine that is suitable for treating containers. Non-limiting examples of treatment machines include filling machines for filling containers with desired content, cleaning machines for cleaning containers, and labeling machines for labeling containers.

WO 2008/145363 A1 teaches a reluctance motor having a hollow bore that is available in its interior. This hollow bore couples to a drive shaft. The drive shaft transmits rotary movements of the drive unit to the manipulation unit.

A manipulation unit can be a starwheel for receiving and storing, on a circumference thereof, containers that are to be filled, cleaned, or labeled. Another example of a manipulation unit is a screw shaft that screws caps to the tops of bottles that are to be closed. A manipulation unit therefore encompasses any unit that holds, grips, cleans, prints on, or otherwise manipulates a container.

The measures disclosed in WO 2008/145363 have proven to be successful in principle. However, there is still a need to make treatment machines smaller. Associated with this is the further need to satisfy hygiene requirements to the greatest extent possible. Container treatment machines need to be cleaned regularly. This requires a compact exterior as well as smooth surfaces to reduce any build-up of dirt and mold.

SUMMARY

The invention addresses technical problems of developing a treatment machine for containers with a compact and easy-to-clean structure.

A container treatment machine that solves the foregoing technical problem has a hollow bore to accommodate machine-specific subassemblies and/or machine-specific lines.

A container treatment machine that embodies the invention includes a drive unit that has a hollow bore. An example of such a drive unit is a reluctance motor. A reluctance motor has a rotor and a stator. The rotor is usually made from a soft magnetic material, e.g. iron. The stator contains the solenoid. Because it has no permanent magnets and does not have current flowing through it, the rotor can have a hollow bore. In contrast, the stator is designed to be stationary. In this way, the hollow bore is formed in a rotating hollow shaft that is held in the rotor to rotate therewith.

In an alternative embodiment, the hollow shaft is stationary and connects to a stationary drive housing via a carrier.

In other embodiments, the hollow bore is located centrally in relation to the drive unit. The drive unit can be rotationally symmetrical, with the hollow bore through its center on the axis of rotation.

In some embodiments, the hollow bore passes through both the drive unit and the manipulation unit. In others, the hollow bore passes through only the drive unit and opens into the manipulation unit. The drive unit and/or the manipulation unit usually surrounds the hollow bore and, with it, the hollow shaft.

In some embodiments, the rotor is connected to the manipulation unit so as to rotate therewith. This can be brought about in such a way that the hollow bore is formed in the rotating hollow shaft, which in turn is connected to the manipulation unit and the rotor.

In these embodiments, the rotor is located inside the stator or is enclosed by the stator. The rotor in turn encloses the hollow shaft. This defines the hollow bore in the interior. The stator, the rotor, and the hollow shaft defining the hollow bore are arranged concentrically in relation to a common axis of rotation. The drive unit, the hollow shaft, and the hollow bore enclosed by the hollow shaft are rotationally symmetric about this axis of rotation.

In one embodiment, the hollow shaft is connected to the manipulation unit if the hollow shaft itself rotates. In this case, the manipulation unit is connected to the hollow shaft so as to rotate therewith.

In an alternative embodiment, the manipulation unit is connected directly to the rotor of the drive unit.

In both embodiments, an intermediate transmission can be provided. This intermediate transmission works on the manipulation unit.

In general, however, the drive unit acts directly on the manipulation unit. As a result, the drive unit acts as a direct drive for the manipulation unit. This takes place with the optional interposition of the hollow shaft. In this case, the hollow shaft establishes the desired connection between the rotor of the drive unit and the manipulation unit.

Treatment machines for containers need to be cleaned regularly. These treatment machines also act as cleaning machines for the containers. To facilitate cleaning, it is desirable to have an easy-to-clean surface and a compact structure.

To facilitate such cleaning, certain embodiments have a manipulation unit that is sealed off relative to a drive housing that accommodates the drive unit. One way to do this is by internal sealing. Such sealing takes account of the fact that the drive housing is designed to be stationary, while the manipulation unit moves relative to the stationary drive housing. In some embodiments, the movement is rotation. To achieve rotational sealing in these embodiments, the manipulation unit is usually mounted on a lid of the drive housing so as to be rotatable.

In this case, the configuration will usually be such that the lid is equipped with a raised edge. This raised edge on the lid of the drive housing engages an annular groove in the manipulation unit. This annular groove is consequently located in the interior of the manipulation unit. This ensures additional sealing. The sealing thus takes place in the interior of the manipulation unit relative to the raised edge of the lid of the drive housing. This results in a particularly effective sealing of the drive housing and the manipulation unit.

In some embodiments, the mounting is toughened by having the raised edge be equipped with a wear ring. Together with the raised edge on the lid of the drive housing, this wear ring substantially fills the annular groove. The wear ring generally faces a wall of the annular groove and therefore absorbs friction relative to the stationary lid with its raised edge. This friction is associated with rotary movements of the manipulation unit. In some embodiments, at least one seal, generally a radial shaft seal, is provided between the wear ring and the manipulation unit. In addition, the wear ring is sealed off by a further seal relative to the raised edge on the lid of the drive housing.

The hollow bore is advantageously used as an accommodation space or accommodation volume for machine-specific subassemblies and/or machine-specific lines. Non-limiting examples of machine-specific subassemblies include mechanical drive elements and sensors.

The hollow bore can also receive and accommodate mechanical drive elements such as cams, transmissions, and gearwheel arrangements. These mechanical drive elements can apply additional movement to bottles carried by the manipulation unit. Using these mechanical drive elements, it becomes possible to swivel, to rotate, and to lift a bottle guided in a circle by the manipulation unit.

The machine-specific subassemblies accommodated in the hollow bore can include sensors. Examples of sensors include light barriers and rotational speed sensors. These sensors enable the position, and rotational speed of the manipulation unit to be determined.

Other machine-specific subassemblies can include initiators, such as switches and locators. These initiators can be used to control or start certain machine-specific actions. For example, it is conceivable to use the rotation angle position of the manipulation unit to start and to stop the filling of bottles guided along a circular path by the manipulation unit.

In addition, further machine-specific subassemblies such as cantilever arms, flanges, and additional motors can be introduced or placed into the hollow bore to enable the treatment machine to achieve its intended purpose.

The hollow bore can alternatively or additionally be designed to accommodate machine-specific lines. Such lines are often required for operation of the machine. Examples of machine-specific lines include supply lines for media, electricity, and data. An embodiment in which a supply line for media, for example filling media or cleaning media, is passed through the hollow bore is particularly advantageous.

All of these supply lines and/or machine-specific subassemblies can advantageously be placed inside the hollow bore because the hollow bore or the space defined by the hollow bore is designed to be stationary and is generally located centrally in the drive housing. Furthermore, the hollow bore usually passes through the drive housing from the bottom to the top. This is not changed by the fact that the hollow bore is formed in a rotating hollow shaft.

A hollow bore is particularly suitable for accommodating the supply lines described above, which are stationary, as well as for accommodating and storing machine-specific subassemblies that are likewise usually stationary. As a result, the hollow bore is, in practice, provided as an additional accommodation space inside the drive housing and is therefore provided in a protected manner. Machine-specific subassemblies as well as lines and supply lines located within the hollow bore are thus not exposed to dirt.

As a result, a particularly compact structure is provided and at the same time a design with minimal indentation is achieved. This results in a hygienic machine that can be cleaned easily and frequently. The invention thus provides a treatment machine or transport machine for containers having a particularly compact structure that facilitates maintenance of hygiene. All of the lines previously guided outside the drive housing and all of the machine-specific subassemblies previously placed outside can in practice be stored inside the drive housing and can therefore be protected. As a result, the machine-specific subassemblies and lines are accommodated in and surrounded by the drive housing. This not only promotes a compact structure but also facilitates the cleaning of the treatment machine.

A further advantage arises from the ability to have cleaning nozzles that protrude directly and centrally from the hollow bore. This facilitates the attachment and positioning of nozzles because the bottles to be treated are also moved relative to the center where the hollow bore is located. The drive unit can be used as a bottle transfer frame for transferring bottles that are transported or moved on starwheels.

As a result of the disclosed configuration, further subassemblies, such as a heater, can be accommodated inside the drive housing. A heater is useful for heating water that is fed via a supply line and used for cleaning.

It is also possible to feed gases for treating bottles via suitably configured lines or supply lines. Such gases include, for example, nitrogen, which is filled into the bottles to drive out oxygen located therein. Supply lines placed in the hollow bore can also be used to feed carbon dioxide to carbonate beverages.

The compact design of the treatment machine according to the invention promotes the accessibility of the manipulation unit, which can be configured for example as a starwheel. The design also eliminates protruding and externally attached supply lines or subassemblies by accommodating them in a centrally provided hollow bore.

In another embodiment, the hollow bore accommodates a supply line for media to be bottled. A treatment machine in which this is the case would generally be a filling machine.

As an alternative or in addition, however, the hollow bore can also accommodate one or more supply lines for cleaning fluid or general cleaning media. In this case, the treatment machine is configured as a cleaning machine.

Finally, the invention also relates to a method for operating a treatment machine for containers.

In one aspect, the invention features an apparatus including a treatment machine for containers. Such a treatment machine has a drive unit, and a manipulation unit connected to the drive unit. The drive unit includes a hollow bore that is configured to accommodate either a machine-specific subassembly or a machine-specific line.

In some embodiments, the drive unit includes a reluctance motor.

Embodiments also include those in which the machine-specific subassembly includes a mechanical drive element and those in which it includes a sensor.

Other embodiments include those in which the machine-specific line is a supply line. These include embodiments in which the supply line supplies a medium, including a cleaning medium, those in which it supplies electricity, those in which it supplies data, and those in which it supplies media to be bottled in the container. Also included are embodiments in which machine-specific lines are used as supply lines for data, media, and/or electricity in any combination.

Embodiments include those in which the drive unit surrounds the hollow bore and those in which the manipulation unit surrounds the hollow bore. In some embodiments, the hollow bore passes through both the drive unit and the manipulation unit.

Also included are embodiments in which the hollow bore is arranged centrally in relation to the drive unit, and those in which the drive unit is a rotationally symmetrical drive unit.

In some embodiments, the drive unit has a stator and a rotor. In these embodiments, the rotor is connected to the manipulation unit.

In other embodiments, the hollow bore is formed in a hollow shaft. Among these are embodiments in which the hollow shaft carries the rotor.

In some embodiments, the manipulation unit is sealed off internally relative to a drive housing that accommodates the drive unit.

Other embodiments include a lid associated with the drive housing. In these embodiments, the manipulation unit is mounted on the lid so as to be able to rotate. Among these are embodiments in which the lid engages a raised edge in an annular groove in the manipulation unit. Among these are embodiments in which the raised edge includes a wear ring that, together with the edge, substantially fills the annular groove.

In another aspect, the invention features a method for operating a container-treatment machine that has a drive unit and a manipulation unit connected to the drive unit, the drive unit being equipped with a hollow bore. Such a method includes accommodating, in the hollow bore, a machine-specific subassembly and/or a machine-specific line.

BRIEF DESCRIPTION OF THE DRAWINGS

The invention will be explained in more detail below with reference to the drawings, in which.

DETAILED DESCRIPTION

The figures show a treatment machine for containers 1. In the exemplary embodiment, the containers 1 to be treated are bottles, such as PET bottles 1. However, this is only an example and is not intended to be limiting. In the illustrated embodiment, treatment includes cleaning containers 1 and/or self-cleaning of the treatment machine. In this case, therefore, the machine is a rinsing machine or as a cleaning machine. The invention is not, however, limited to rinsing machines or cleaning machines.

Figure 1:
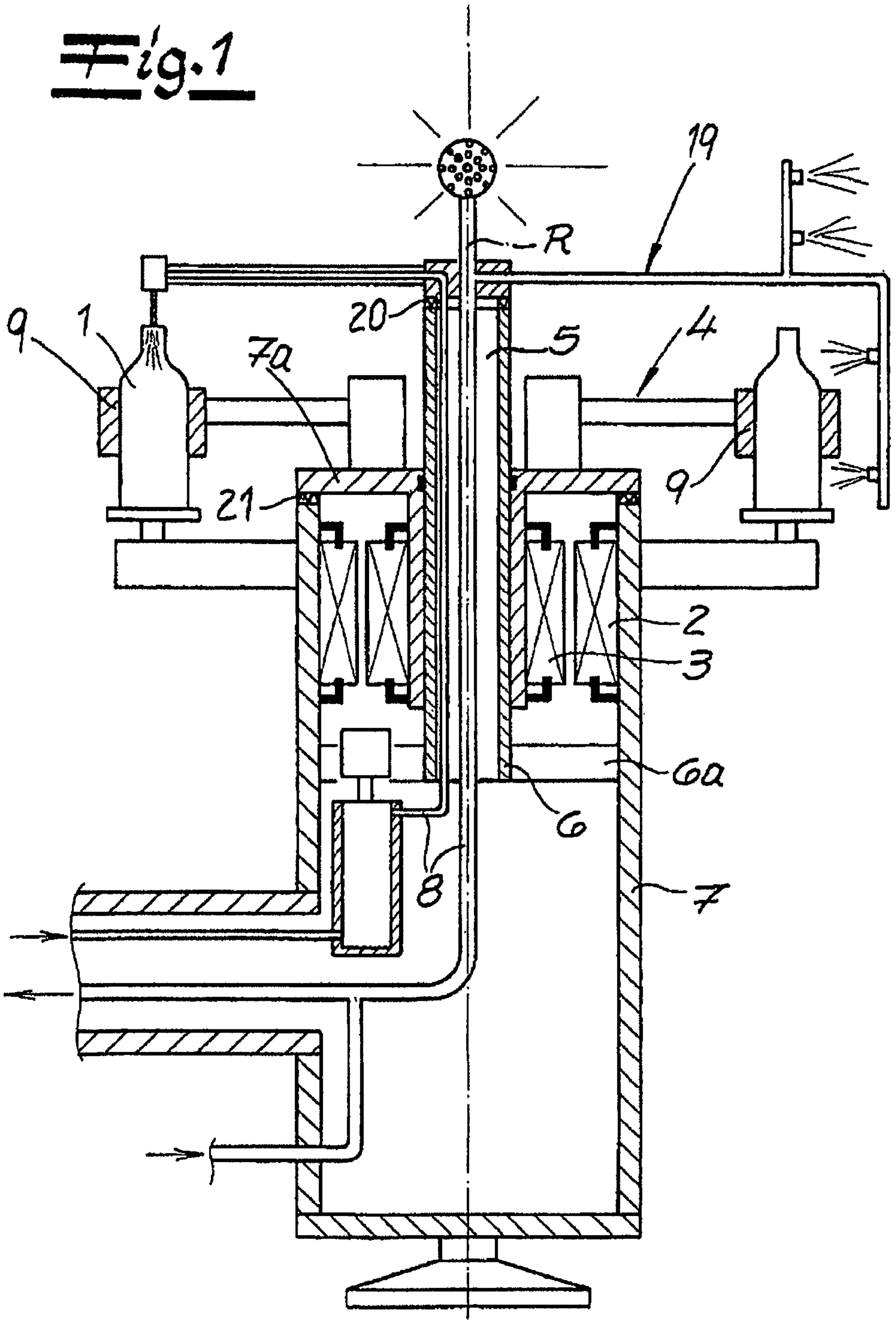
FIGS. 1 to 4 show different embodiments of the container treatment machine according to the invention.

The treatment machine has at least one drive unit, best be seen in FIG. 1, that is also found in a comparable manner in the other exemplary embodiments. The drive unit has a stator 2, a rotor 3, and a hollow bore 5. In addition to the drive unit, there is also a manipulation unit 4. The manipulation unit 4 is connected to the drive unit or is acted upon directly by the drive unit so as to be set in rotation about an axis of rotation R. In the exemplary embodiment, the hollow bore 5 is formed in a stationary hollow shaft 6. In other embodiments, the hollow shaft 6 can rotate.

In the exemplary embodiment, and as seen in FIG. 1, a carrier **6*a* connects the hollow shaft 6 to a drive housing 7 that completely surrounds and accommodates the drive unit. A rotor 3 of the drive unit is arranged on a rotating closure element 7*a* mounted at the top of the drive housing 7**.

The closure element **7*a* carries the manipulation unit 4. As the rotor 3 rotates around the axis of rotation R relative to the stator 2, it drives the rotatably-mounted closure element 7*a*, and with it, the likewise rotating manipulation unit 4. The stator 2 is connected to or held by the drive housing 7**.

The stator 2, which is stationary, is connected to the drive housing 7. The drive housing 7, like the stator 2, is stationary.

In contrast, the rotor 3 rotates around the axis of rotation R. Because the manipulation unit 4 is connected to the rotor 3, it rotates with the rotor 3. The drive housing 7, the stator 2, the rotor 3, and the hollow shaft 6 are rotationally symmetric about the common axis of rotation R. Furthermore, the stator 2, the rotor 3, and the hollow shaft 6 are concentric with the axis of rotation R. The drive housing 7 does not have to be rotationally symmetrical.

The drive unit is a reluctance motor. As a result, the hollow bore 5 and the hollow shaft 6 can go through the center of the drive unit. The hollow bore 5, which is inside the hollow shaft 6, accommodates machine-specific subassemblies and/or lines 8. Examples of machine-specific subassemblies that can be accommodated inside the hollow bore 5 are mechanical drive elements, sensors, etc. In the illustrated examples, only machine-specific lines or supply lines 8 are accommodated in the hollow bore 5.

In the illustrated embodiment, a supply line 8 supplies media, such as cleaning media. In principle, however, a supply line 8 for supplying electricity, or for data exchange, among other things, can also be arranged inside the hollow bore 5.

Figure 2:
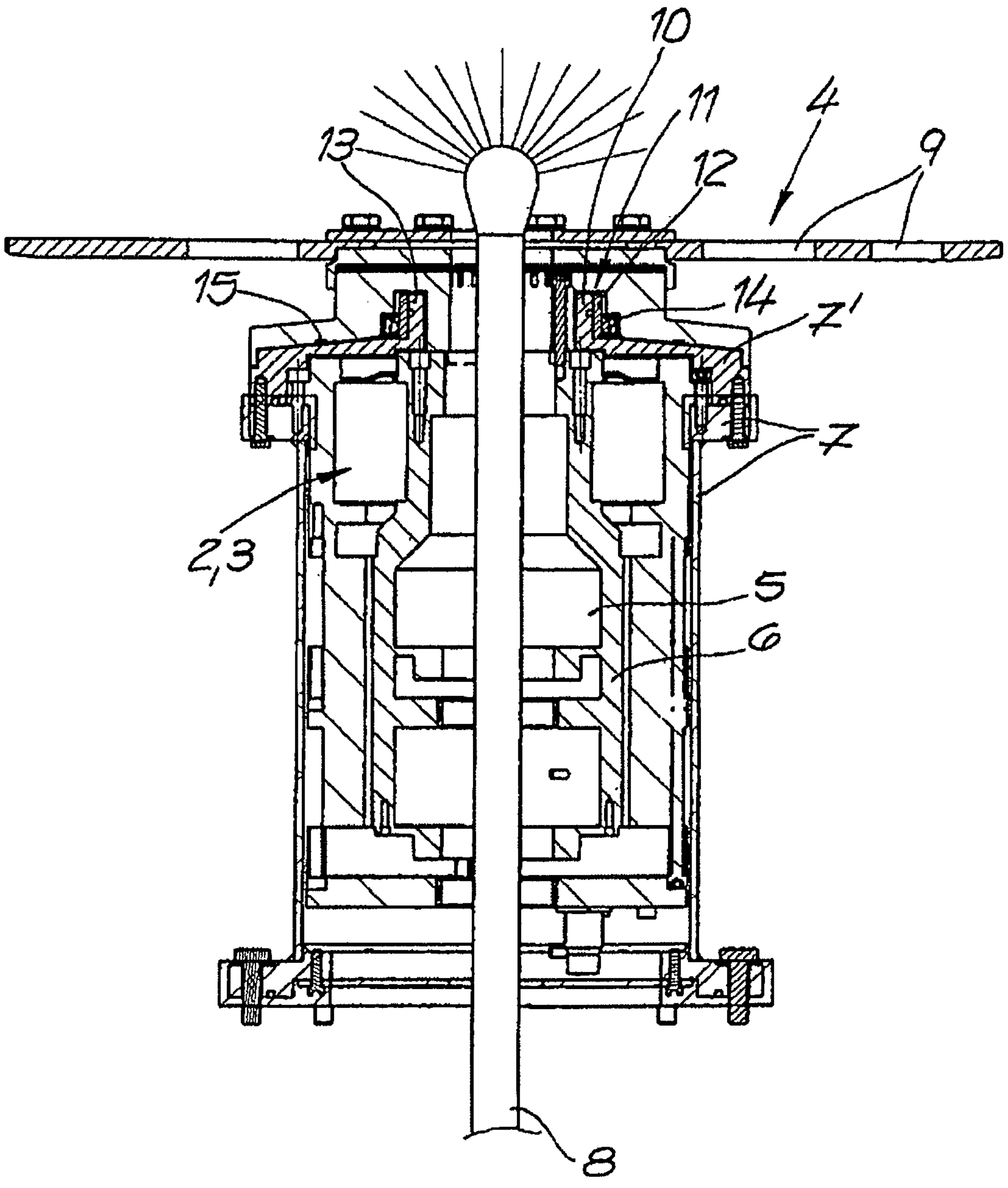
Figure 3:
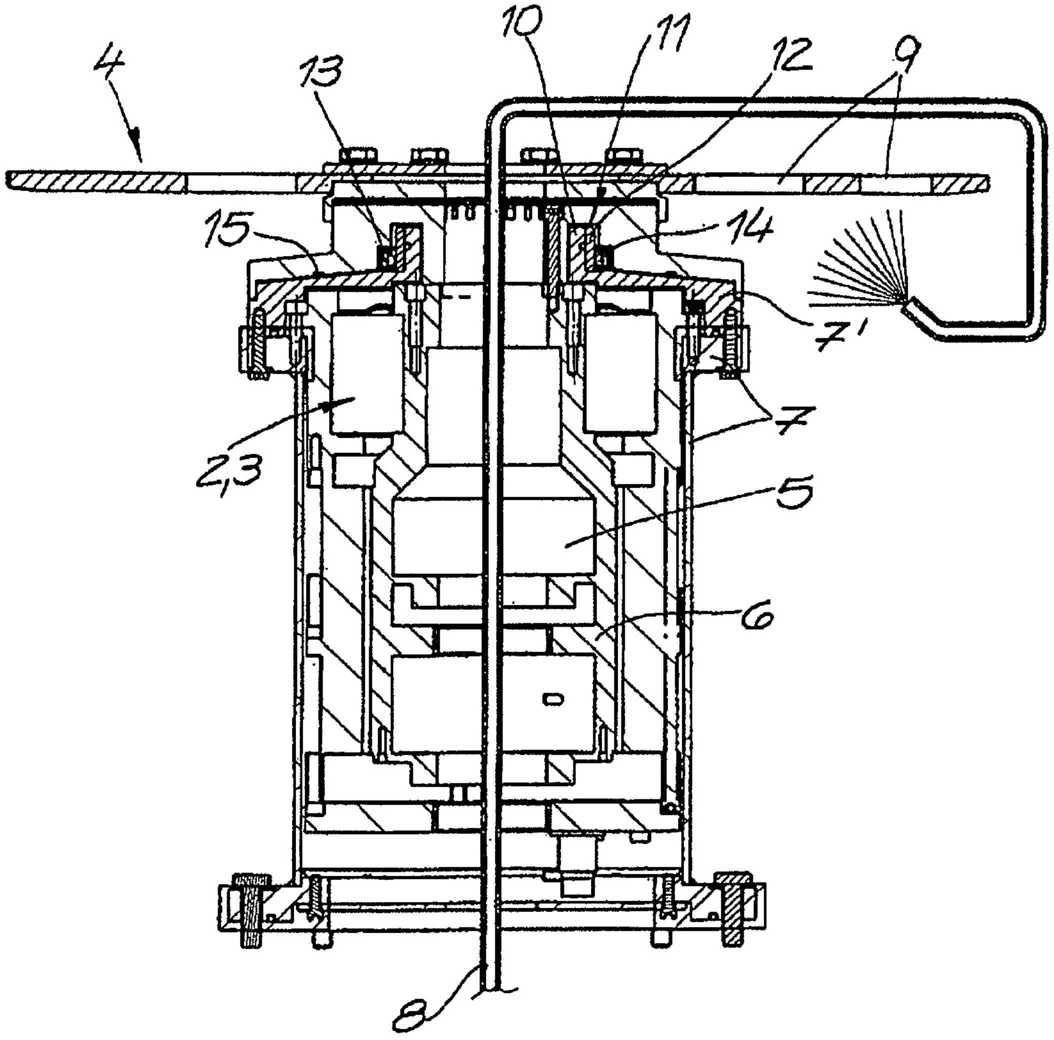
Figure 4:
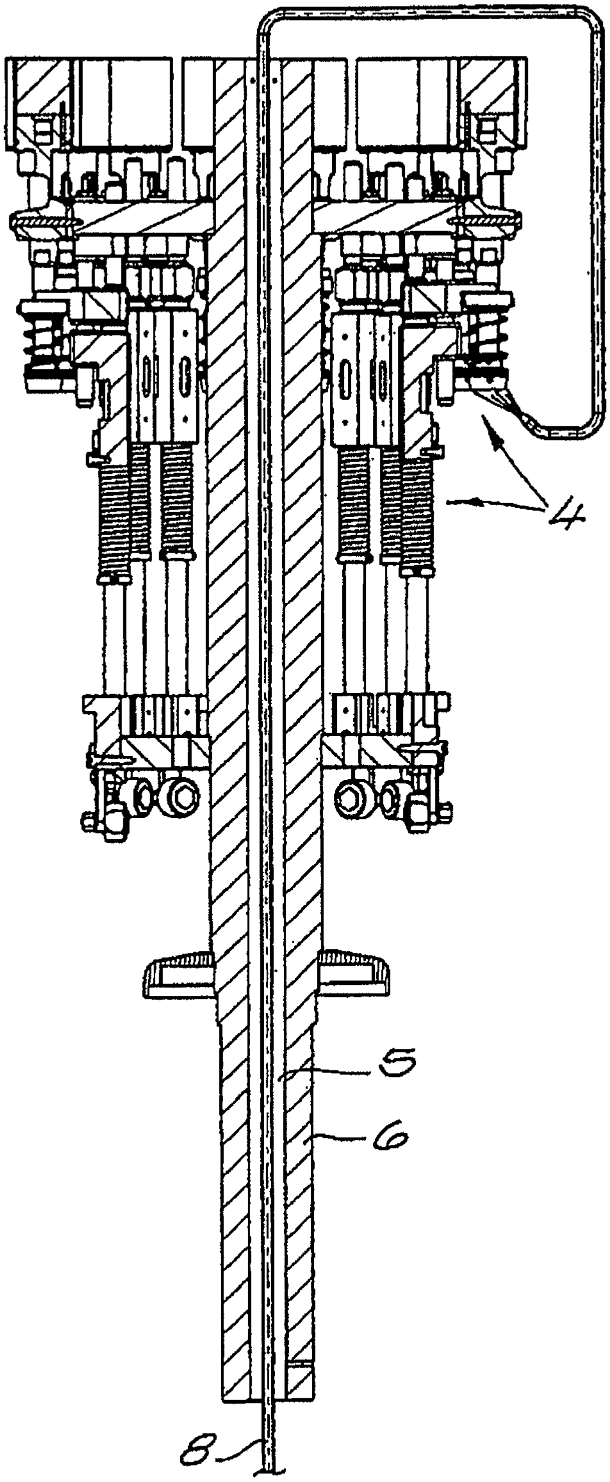

In the illustrated embodiments, the hollow bore 5 passes through both the drive unit and the manipulation unit 4. In the example shown in FIGS. 1 to 3, the manipulation unit 4 is a starwheel that has holders 9 on its circumference for holding bottles 1 therein. In the embodiment shown in FIG. 4, the manipulation unit 4 has screw shafts screwing caps on bottles 1.

The drive unit encircles both the hollow bore 5 and the hollow shaft 6 that defines the hollow bore 5. Furthermore, the hollow bore 5 is configured centrally in relation to the rotationally symmetrical drive unit.

A revolving electromagnetic field generated by the stator 2 rotates the rotor 3. In some embodiments, the rotor 3 couples to the hollow shaft 6 so as to rotate therewith. In such an embodiment, the hollow shaft 6 rotates.

In general, however, the hollow shaft 6 is stationary and the rotor 3 connects to the manipulation unit 4 so that the two rotate together. As a result, the drive unit acts directly on the manipulation unit 4.

Figure 5:
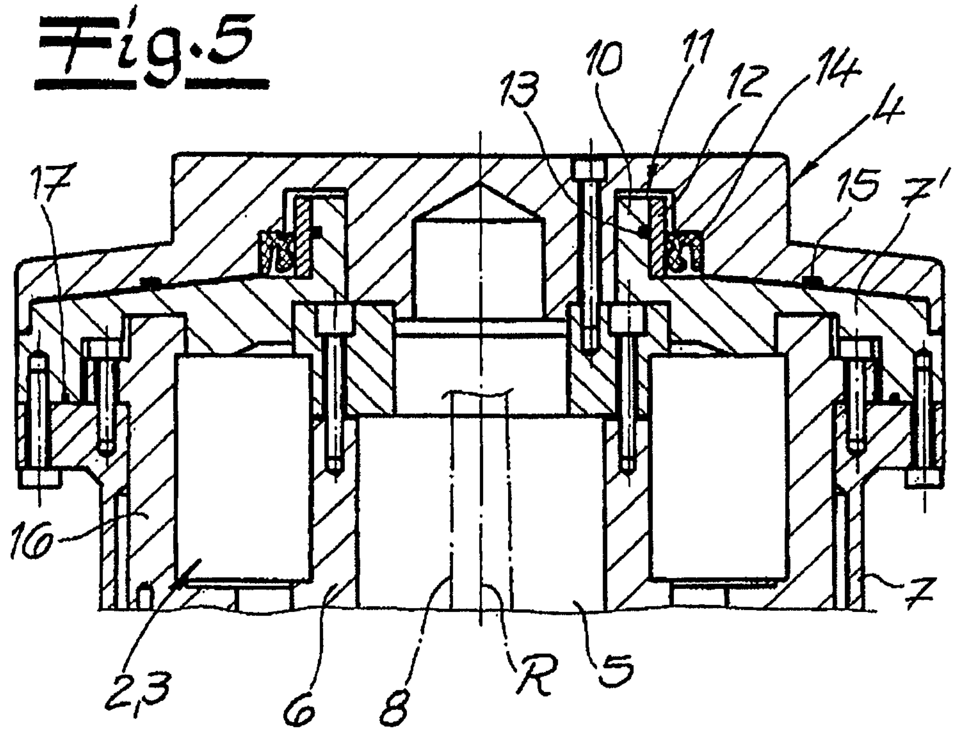
FIG. 5 shows detail from FIG. 2 or 3.
Figure 6:
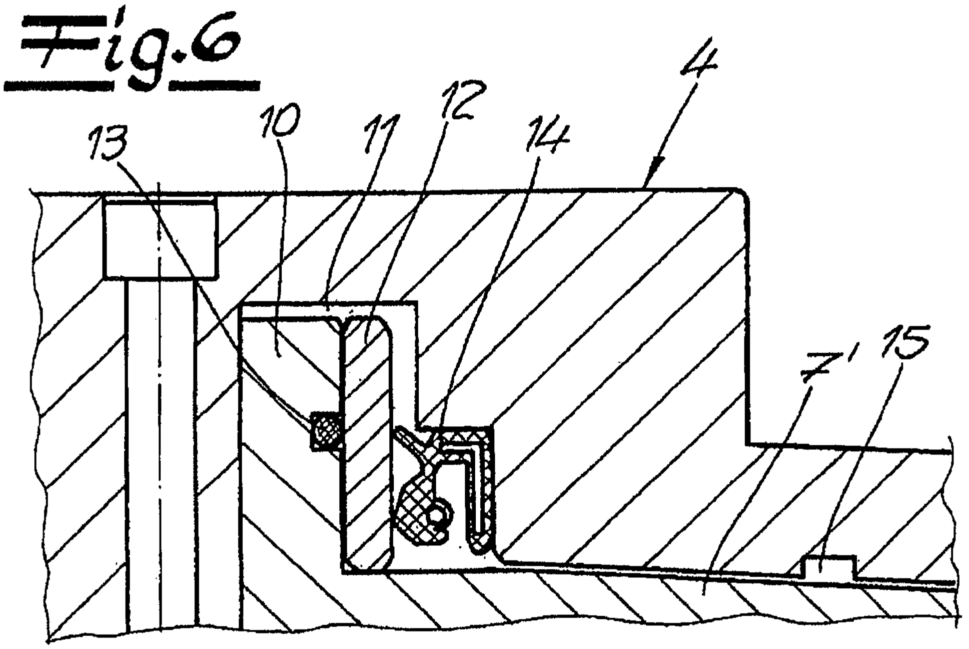
FIG. 6 shows further detail from FIG. 5.

In the enlarged views shown in FIGS. 5 and 6, the manipulation unit 4, which is a starwheel, has special sealing relative to the drive housing 7. According to the enlarged view shown in FIGS. 5 and 6, in the embodiments shown in FIGS. 1-3, the manipulation unit 4 is sealed off relative to the drive housing 7, which accommodates the drive unit, and is sealed off internally relative thereto. Any seals or sealing measures are provided inside the manipulation unit 4.

For this purpose, the manipulation unit 4 is rotatably-mounted on a lid 7' of the drive housing 7. The lid 7' is equipped with a raised edge 10. The raised edge 10, like the lid 7' and the drive housing 7 as a whole, is stationary. In contrast, the manipulation unit 4 carries out rotational movements around the axis of rotation R. These rotational movements are brought about by the drive unit.

Sealing of the manipulation unit 4 relative to the drive housing 7 or the lid 7' of the drive housing 7, which holds the manipulation unit 4, is achieved by having the lid 7' engage the raised edge 10 in an annular groove 11 in the manipulation unit 4. The raised edge 10 is equipped with a wear ring 12. The wear ring 12 externally surrounds the raised edge 10 and almost completely fills an intermediate space between the raised edge 10 and an inner face of the annular groove 11. The wear ring 12 therefore primarily absorbs rotations of the manipulation unit 4 around the axis of rotation R.

An O-ring seal 13 in the edge 10 ensures that the wear ring 12 is sealed off relative to the raised edge 10. The O-ring seal 13 is sunk into the raised edge 10 approximately centrally in relation to the wear ring 12. A radial shaft seal 14 is provided opposite the O-ring seal 13. The wear ring 12 is held in a way that provides a seal between the O-ring seal 13 and the radial shaft seal 14. Like the O-ring seal 13, the radial shaft seal 14 is rotationally symmetrical about the axis of rotation R. The radial shaft seal 14 is held in a receiving space that radially widens the annular groove 11.

A capillary barrier 15 is provided at the edge of the manipulation unit 4. In conjunction with the O-ring seal 13 and the radial shaft seal 14, the capillary barrier 15 ensures that no fluid, such as cleaning fluid, enters the interior of the drive housing 7 via the intermediate space between the lid 7' and the underside of the manipulation unit 4.

In addition, the drive housing 7 has one or more centering rings 16 encircling its circumference. These circumferential centering rings 16 ensure that the lid 7' is received and held centrally in relation to the axis of rotation R at the top of the otherwise pot-shaped drive housing 7. An additional further seal 17 in the region of a top flange of the drive housing 7 and a flange of the lid 7' ensures the necessary sealing at this point.

The supply line 8 for cleaning media is accommodated inside the hollow bore 5 and can thus be stationary. As a result, branches 19 from the supply line 8 can easily be formed. These branches can be used to spray the bottles 1 and/or individual constituents of the treatment machine, as shown in FIG. 1.

Also visible in FIG. 1 is a rotary seal 20 that seals off the stationary branch 19 and the stationary supply line 8 connected thereto relative to the stationary hollow shaft 6. A rotary seal 21 in simplified form can likewise be seen in FIG. 1. The closure element 7*a* rotates together with the rotor 3 and the manipulation unit 4. A rotary seal 21 seals the closure element 7*a* from the drive housing 7. In the embodiment shown in FIG. 1, the manipulation unit 4 is placed directly on top of the drive housing 7 or is mounted on top of the drive housing 7 with the interposition of the closure element 7*a*. In contrast to the embodiments shown in FIGS. 2 and 3, no lid 7' is interposed.

Having described the invention, and a preferred embodiment thereof, what is claimed as new, and secured by Letters Patent is:

1. An apparatus comprising a container-treatment machine for treating containers, said container-treatment machine comprising a drive unit surrounded by a drive housing, and a manipulation unit connected to the drive unit, wherein the drive unit comprises walls forming a hollow bore, the hollow bore being configured to accommodate a structure selected from the group consisting of a machine-specific subassembly and a machine-specific line, said apparatus further comprising a lid that covers the drive housing, wherein the manipulation unit is directly mounted on the lid, and wherein the manipulation unit is rotatable relative to the lid.

2. The apparatus of claim 1, wherein the structure comprises a machine-specific subassembly that comprises a mechanical drive element.

3. The apparatus of claim 1, wherein the structure comprises a machine-specific subassembly that comprises a sensor.

4. The apparatus of claim 1, wherein the structure comprises a machine-specific line used as a supply line.

5. The apparatus of claim 1, wherein the structure comprises a machine-specific line used as a supply line for data.

6. The apparatus of claim 1, wherein the structure comprises a machine-specific line used as a supply line for electricity.

7. The apparatus of claim 1, wherein the hollow bore passes through both the drive unit and the manipulation unit.

8. The apparatus claim 1, wherein the drive unit surrounds the hollow bore.

9. The apparatus of claim 1, wherein the manipulation unit surrounds the hollow bore.

10. The apparatus of claim 1, wherein the hollow bore is arranged centrally in relation to the drive unit, and wherein the drive unit is a rotationally symmetrical drive unit.

11. The apparatus of claim 1, wherein the drive unit comprises a stator and a rotor, and wherein the rotor is connected to the manipulation unit.

12. The apparatus of claim 1, wherein the hollow bore is formed in a hollow shaft.

13. The apparatus of claim 12, wherein the hollow shaft carries the rotor.

14. The apparatus of claim 1, wherein the manipulation unit is sealed off internally relative to a drive housing that accommodates the drive unit.

15. The apparatus of claim 1, wherein the lid engages with a raised edge in an annular groove in the manipulation unit.

16. The apparatus of claim 15, wherein the raised edge comprises a wear ring that, together with the edge, substantially fills the annular groove.

17. The apparatus of claim 1, wherein the hollow bore is configured to accommodate a supply line for media to be bottled in the container.

18. The apparatus of claim 1, wherein the hollow bore is configured to accommodate a supply line for delivery of cleaning media.

19. A method comprising operating a treatment machine for containers, said treatment machine comprising a drive unit surrounded by a drive housing and a manipulation unit connected to the drive unit, the drive unit being equipped with walls forming a hollow bore, wherein said treatment machine further comprises a lid that covers the drive housing, wherein the manipulation unit is directly mounted on the lid, and wherein the manipulation unit is rotatable relative to the lid, wherein operating a treatment machine comprises accommodating, in the hollow bore, one of a machine-specific subassembly and a machine-specific line.

20. The apparatus of claim 1, wherein said drive unit comprises a reluctance motor.

21. The apparatus of claim 1, wherein the structure comprises a machine-specific line used as a supply line for a medium.

22. The apparatus of claim 1, wherein the structure comprises a plurality of machine-specific lines used as supply lines for media.

23. The apparatus of claim 1, wherein said container-treatment machine is selected from the group consisting of a container-filling machine, a container-cleaning machine, and a container-labeling machine.

24. The apparatus of claim 1, wherein the manipulation unit is selected from the group consisting of a holder, a gripper, a cleaner, a printer, a filler, and a labeler.

25. The apparatus of claim 1, wherein the container-treatment machine comprises a star-wheel having a periphery on which containers are supported.

* * * * *